US012719921B2

(12) United States Patent
Bin Noon et al.

(10) Patent No.: US 12,719,921 B2
(45) Date of Patent: Aug. 25, 2026

(54) TECHNIQUES FOR SECURING DATA VIA DATA LINEAGE

(71) Applicant: Tannin Inc., Bainbridge Island, WA (US)

(72) Inventors: Hod Ahikam Bin Noon, Jerusalem (IL); Eran Yehuda Barak, Seattle, WA (US); Yitai Schwartz, Tel Aviv (IL)

(73) Assignee: Tannin Inc., Bainbridge Island, WA (US)

( * ) Notice: Subject to any disclaimer, the term of this patent is extended or adjusted under 35 U.S.C. 154(b) by 87 days.

(21) Appl. No.: 18/923,083

(22) Filed: Oct. 22, 2024

(65) Prior Publication Data

US 2026/0129068 A1 May 7, 2026

(51) Int. Cl.
*H04L 9/40* (2022.01)

(52) U.S. Cl.
CPC ...... *H04L 63/1441* (2013.01); *H04L 63/1416* (2013.01)

(58) Field of Classification Search
CPC ........................ H04L 63/1441; H04L 63/1416
USPC ............................................................ 726/23
See application file for complete search history.

(56) References Cited

U.S. PATENT DOCUMENTS 9,864,751 B2 1/2018 Halberstadt et al.
10,540,383 B2 1/2020 Cobbett et al.
11,243,919 B2 2/2022 Bartlett et al.
11,681,651 B1 6/2023 Aggarwal et al.
11,847,131 B2 12/2023 Hyde et al.
2022/0014423 A1* 1/2022 Smith ..................... H04L 69/40
2022/0131879 A1* 4/2022 Naik ..................... G06F 21/568
2023/0036186 A1 2/2023 Blum
2023/0396640 A1* 12/2023 Miller ................ G06Q 30/0283
2024/0095662 A1* 3/2024 Xiao ....................... H04L 41/16
2025/0190291 A1* 6/2025 O'Connor ........... G06F 11/0751
2025/0300828 A1* 9/2025 Reddy Appireddygari Venkataramana ........ H04L 9/14

* cited by examiner

*Primary Examiner* — Moeen Khan
(74) *Attorney, Agent, or Firm* — M&B IP Analysts, LLC

(57) ABSTRACT

A system and method for securing data. A method includes assigning identifiers to instances of data objects represented in data indicating movement of the data objects. The identifiers uniquely correspond to respective data objects. The data indicating movement of the data objects is transformed into a data structure having fields corresponding to data lineage parameters and the data lineage parameters include location, time, and the identifiers. Events represented in the transformed data are correlated based on shared attributes among the events, where the shared attributes include common locations and common unique identifiers of the data objects involved in the events. A data lineage is constructed based on the correlated events by linking between events based on the correlation and organizing the linked events with respect to time. A cybersecurity threat is detected based on the data lineage, and mitigated by blocking traffic with respect to the cybersecurity threat.

17 Claims, 5 Drawing Sheets

TECHNIQUES FOR SECURING DATA VIA DATA LINEAGE

TECHNICAL FIELD

The present disclosure relates generally to data leakage protection, and more specifically to securing data via data lineage.

BACKGROUND

In modern computing infrastructures, large amounts of data may be stored at any given time. Leaks or other improper access to such data may cause major problems for companies and for entities affected by any data leakage. As a result, techniques for securing data within a computing environment are desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing data. The method comprises: assigning a plurality of identifiers to a plurality of instances of a plurality of data objects represented in data indicating movement of the plurality of data objects, wherein the identifier assigned to each instance uniquely corresponds to exactly one data object of the plurality of data objects; transforming the data indicating movement of the data objects from a first format to a second format, wherein the second format is a data structure having a plurality of fields corresponding to a plurality of data lineage parameters, wherein the plurality of data lineage parameters include location, time, and the plurality of identifiers; correlating a plurality of events represented in the transformed data, wherein the plurality of events is correlated based on shared attributes among events of the plurality of events, wherein the shared attributes at least include common locations and common unique identifiers of the data objects among the plurality of data objects involved in events among the plurality of events; constructing a data lineage based on the correlated plurality of events, wherein constructing the data lineage includes linking between events among the plurality of events based on the correlation and organizing the linked events with respect to time; detecting a cybersecurity threat based on the data lineage; and mitigating the cybersecurity threat by at least blocking traffic with respect to the cybersecurity threat.

Certain embodiments disclosed herein also include a non-transitory computer readable medium having stored thereon causing a processing circuitry to execute a process, the process comprising: assigning a plurality of identifiers to a plurality of instances of a plurality of data objects represented in data indicating movement of the plurality of data objects, wherein the identifier assigned to each instance uniquely corresponds to exactly one data object of the plurality of data objects; transforming the data indicating movement of the data objects from a first format to a second format, wherein the second format is a data structure having a plurality of fields corresponding to a plurality of data lineage parameters, wherein the plurality of data lineage parameters include location, time, and the plurality of identifiers; correlating a plurality of events represented in the transformed data, wherein the plurality of events is correlated based on shared attributes among events of the plurality of events, wherein the shared attributes at least include common locations and common unique identifiers of the data objects among the plurality of data objects involved in events among the plurality of events; constructing a data lineage based on the correlated plurality of events, wherein constructing the data lineage includes linking between events among the plurality of events based on the correlation and organizing the linked events with respect to time; detecting a cybersecurity threat based on the data lineage; and mitigating the cybersecurity threat by at least blocking traffic with respect to the cybersecurity threat.

Certain embodiments disclosed herein also include a system for securing data. The system comprises: a processing circuitry; and a memory, the memory containing instructions that, when executed by the processing circuitry, configure the system to: assign a plurality of identifiers to a plurality of instances of a plurality of data objects represented in data indicating movement of the plurality of data objects, wherein the identifier assigned to each instance uniquely corresponds to exactly one data object of the plurality of data objects; transform the data indicating movement of the data objects from a first format to a second format, wherein the second format is a data structure having a plurality of fields corresponding to a plurality of data lineage parameters, wherein the plurality of data lineage parameters include location, time, and the plurality of identifiers; correlate a plurality of events represented in the transformed data, wherein the plurality of events is correlated based on shared attributes among events of the plurality of events, wherein the shared attributes at least include common locations and common unique identifiers of the data objects among the plurality of data objects involved in events among the plurality of events; construct a data lineage based on the correlated plurality of events, wherein constructing the data lineage includes linking between events among the plurality of events based on the correlation and organizing the linked events with respect to time; detect a cybersecurity threat based on the data lineage; and mitigate the cybersecurity threat by at least blocking traffic with respect to the cybersecurity threat.

Certain embodiments disclosed herein include a method, non-transitory computer readable medium, or system as noted above or below, further including or being configured to perform the following step or steps: identifying a plurality of data flows based on the data lineage, wherein each data flow includes a movement of data, wherein the cybersecurity threat is mitigated based on the identified plurality of data flows.

Certain embodiments disclosed herein include a method, non-transitory computer readable medium, or system as noted above or below, wherein the cybersecurity threat is detected within at least one data flow of the plurality of data flows, wherein the traffic is blocked for at least a portion of the at least one data flow in which the cybersecurity threat is detected.

Certain embodiments disclosed herein include a method, non-transitory computer readable medium, or system as noted above or below, wherein detecting the cybersecurity threat further comprises analyzing the data indicating movement of the data objects with respect to normal behavior patterns.

Certain embodiments disclosed herein include a method, non-transitory computer readable medium, or system as noted above or below, wherein detecting the cybersecurity threat further comprises performing data exfiltration monitoring in order to identify an amount of data being transferred outside of a computing environment that is above a threshold.

Certain embodiments disclosed herein include a method, non-transitory computer readable medium, or system as noted above or below, further including or being configured to perform the following step or steps: classifying the transformed data into at least one classification with respect to data sensitivity, wherein the cybersecurity threat is detected based on the at least one classification.

Certain embodiments disclosed herein include a method, non-transitory computer readable medium, or system as noted above or below, wherein the second format is a format of a storage, further including or being configured to perform the following step or steps: loading at least a portion of the transformed data into the storage based on data among the transformed data stored in fields of the plurality of fields corresponding to the plurality of data lineage parameters.

Certain embodiments disclosed herein include a method, non-transitory computer readable medium, or system as noted above or below, wherein only the data among the transformed data stored in fields of the plurality of fields corresponding to the plurality of data lineage parameters is loaded into the storage.

Certain embodiments disclosed herein include a method, non-transitory computer readable medium, or system as noted above or below, wherein the data lineage is a graph including a plurality of nodes and a plurality of edges between nodes among the plurality of nodes, wherein the plurality of nodes represent a plurality of components that interact with data stored in at least one computing environment, wherein the plurality of edges represent movement of data between components among the plurality of components represented by the nodes.

Certain embodiments disclosed herein include a method, non-transitory computer readable medium, or system as noted above or below, further including or being configured to perform the following step or steps: performing similarity hashing in order to determine whether instances among the plurality of instances match, wherein the plurality of identifiers is assigned based on the similarity hashing.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include methods and systems for securing data using data lineage techniques. To this end, the disclosed embodiments provide techniques for tracking data lineage via observed data flows from a source to or toward a destination, and for using such data lineage in order to make decisions related to securing data.

In an embodiment, different software components are integrated in order to allow for ingesting data transmitted to and from those software components. The software components may include, but are not limited to, software-as-a-service (SaaS) components, on-premises (on-prem) components, messaging systems (e.g., email servers), endpoint components (i.e., software components acting as endpoints), and the like. Activities between, among, or otherwise with the integrated software components are digested. In particular, data indicating activities involving transfers of data such as, but not limited to, file uploads and downloads, are ingested.

The data ingested from the connected software components is analyzed and classified using artificial intelligence techniques. Based on the classification results, analytics are run in order to determine whether each transfer of data indicates a potential cyber threat, a severity for each potential cyber threat, or both. When one or more threats have been detected in this manner, a data lineage may be assembled for one or more data objects involved in the transfers of data which were determined as indicating a potential cyber threat.

In this regard, it is noted that some existing solutions for risk assessment use static rules to analyze potential risks. However, static analysis of data may lead to inaccurate analyses, for example when data of one type is confused with another type of data. Additionally, static analyses are challenging to scale, as scaling with increased amounts of data typically requires more computing resources scaled proportionally to the amount of additional data to be secured. The disclosed embodiments, which leverage data lineage in order to analyze potential risks, may be utilized to yield more accurate risk analysis results than some existing solutions which use static rules while improving scalability by allowing for more efficiently scaling up risk analysis operations relative to the amount of data to be secured via risk analysis.

Figure 1:
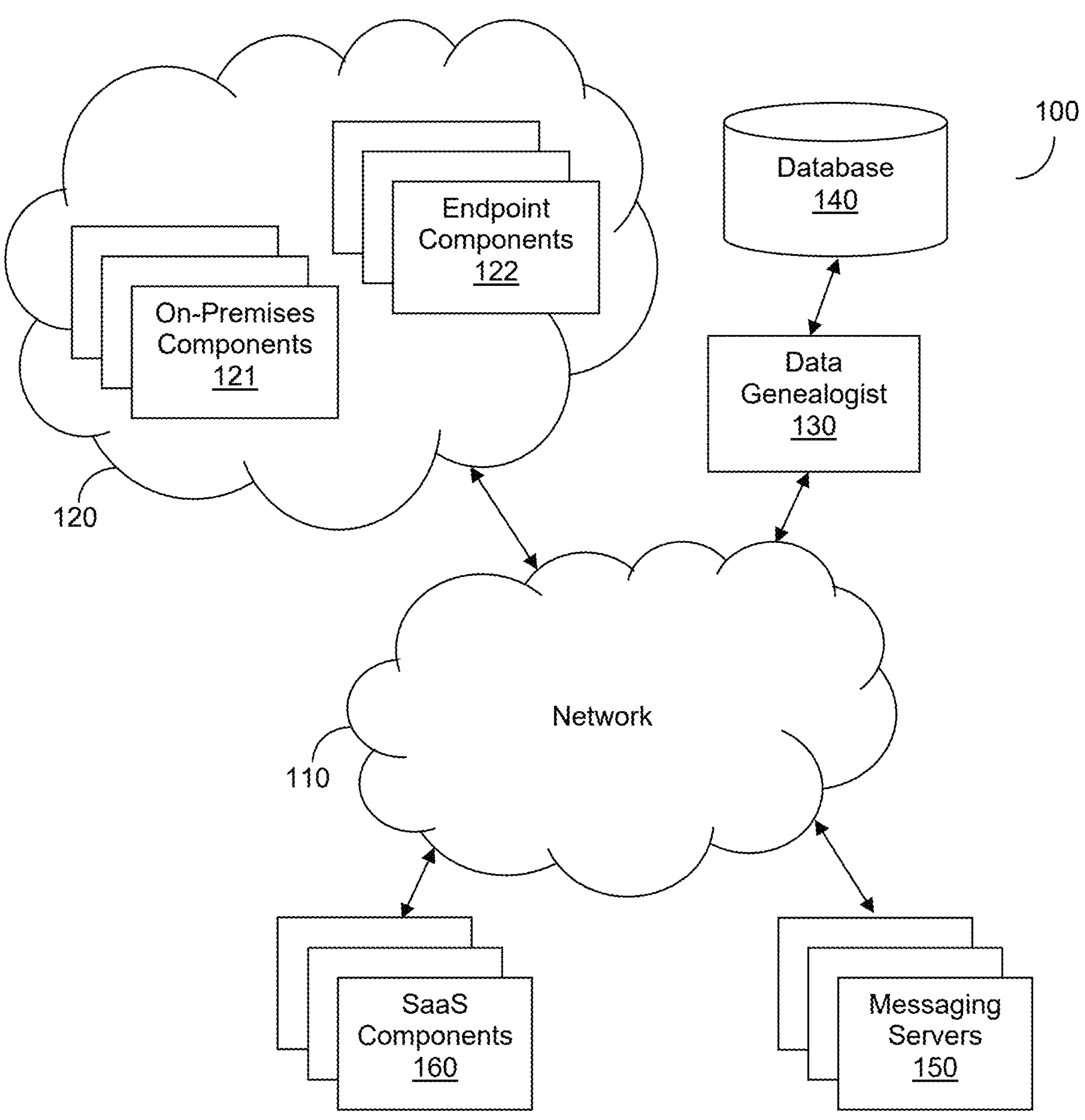
FIG. 1 is a network diagram utilized to describe various disclosed embodiments.

FIG. 1 shows an example network diagram 100 utilized to describe the various disclosed embodiments. In the example network diagram 100, a computing environment 120, a data genealogist 130, one or more messaging servers 150, and one or more software-as-a-service (SaaS) components 160 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As depicted in FIG. 1, the computing environment 120 includes a set of on-premises components 121 and a set of endpoint components 122. The on-premises components 121 may be or may include components configured to transmit data within the computing environment 120. Each of the endpoint components 122 may also be configured to transmit data, including being configured to transmit at least some data outside of the computing environment 120. To this end, each of the endpoint components 122 is connected to one or more networks such as, but not limited to, the network 110.

The data genealogist 130 is configured to assemble data lineages as described herein and to utilize such data lineages in order to secure the computing environment 120 and, more specifically, to secure data stored within the computing environment 120 (e.g., data stored, transmitted, or otherwise used by the on-premises components 121). To this end, the data genealogist 130 is configured to connect to the on-premises components 121 or other data sources within the computing environment 120 (not shown) and to track movement of data as data is transmitted within the computing environment 120, for example, as data is transmitted between on-premises components of the on-premises components 121, between one or more of the on-premises components 121 and one or more of the endpoint components 122, between the endpoint components 122 and one or more external systems (e.g., the messaging servers 150, the SaaS components 160, etc.), combinations thereof, and the like.

In accordance with at least some disclosed embodiments, the data genealogist 130 may include or may otherwise be utilized to realize a data catalog (e.g., the data catalog 250, FIG. 2), a classification engine (e.g., the classification engine 260, FIG. 2), an orchestration engine (e.g., the orchestration engine 270, FIG. 2), a combination thereof, and the like. Such components may be utilized to realize a data pipeline in which data from a combination of any of the on-premises components 121, the endpoint components 122, the messaging servers 150, and the SaaS components 160. A non-limiting example data pipeline including such components of the data genealogist 130 is described further below with respect to FIG. 2.

The data genealogist 130 may be configured to load data which is extracted and transformed into the database 140 for analysis. The data loaded into the database 140 may therefore be analyzed in order to assemble data lineages as discussed herein.

The messaging servers 150 may be or may include, but are not limited to, email servers, instant messaging servers, or other servers used to host messages sent via one or more messaging services. Such messages may include files or other data for which transmission may expose the computing environment 120 for potential cyber threats. In particular, such messages may include requests for certain files or other data, where some requested files or data may include sensitive data for which the possibility of improper access may be a cybersecurity threat.

The SaaS components 160 may be applications, programs, functions, or other components utilized to realize services via computer instructions which communicate with components among the computing environment 120 in order to provide the services. Like the messaging servers 150, communications from the SaaS components 160 may include requests for files or other data which may be sent pursuant to cyberattacks such that those communications may represent cybersecurity threats.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

Figure 2:
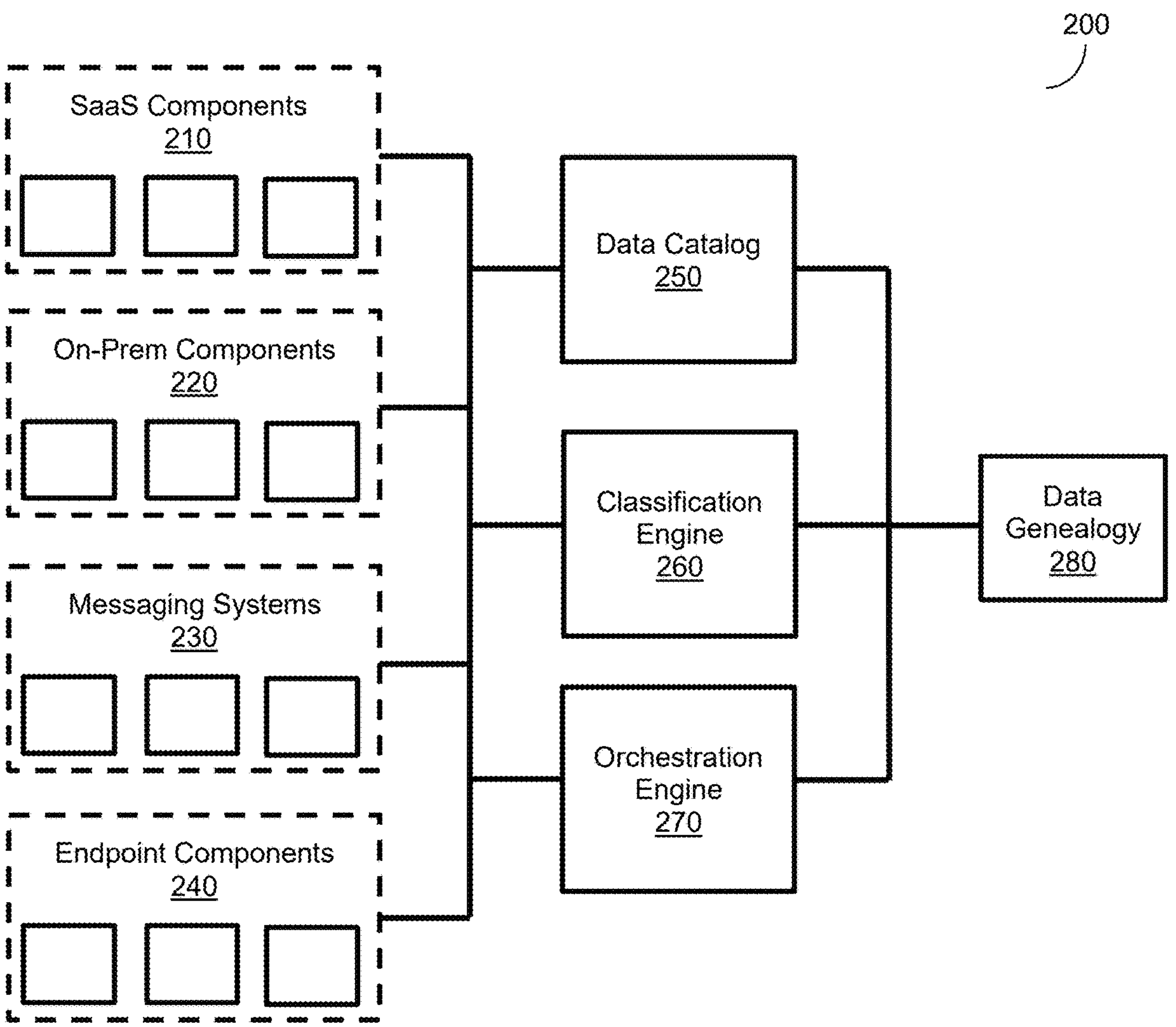
FIG. 2 is an illustrative data flow diagram.

FIG. 2 is an illustrative data flow diagram 200. As depicted in FIG. 2, data from respective sets of SaaS components 210, on-premises (on-prem) components 220, messaging systems 230, and endpoint components 240 are utilized as inputs to a data catalog 250, a classification engine 260, an orchestration engine 270, and a data genealogy 280.

Each of the SaaS components 210, on-premises (on-prem) components 220, messaging systems 230, and endpoint components 240 provides data related to data transmission for analysis as described herein. Such data related to data transmission may be provided to the data catalog 250, the classification engine 260, and the orchestration engine 270 for use in assembling data lineages and making decisions for securing data using the data lineages as described herein.

The data catalog 250 may be or may be included in a target storage into which extracted and transformed data is loaded. Data loaded into the data catalog 250 may be classified for potential sensitivity by the classification engine 260 and may be analyzed by the orchestration engine 270 in order to assemble data lineages. In this regard, the orchestration engine may be configured to analyze such data in order to identify movements of data within the computing environment 120 or between systems or portions thereof in the computing environment 120 with external systems or portions thereof (e.g., the messaging servers 150, the SaaS components 160, or portions thereof). Such movements may include transmission of data which may be analyzed as described herein in order to assemble data lineages.

The data catalog 250 may catalog data-related entities such as, but not limited to, resources, users, activities (e.g., file-related activities), and the like. Resources may include, but are not limited to, files or other resources containing or having access to data. Accordingly, the data catalog 250 may, in some embodiments, store data such as a file inventory showing information about files such as, but not limited to, file name, type, potentially sensitive data identified in files (e.g., data indicating credit card numbers, social security numbers, credentials, encryption keys, etc.), combinations thereof, and the like. Each resource containing sensitive data may be assigned tags corresponding to respective classifications of those resources, tags corresponding to accessibility of those resources to different types of users (e.g., users having different privilege levels), combinations thereof, and the like. The data catalog 250 may further contain data representing users or other entities having access to computing environments (e.g., employees, contractors, trusted third parties, etc.), and may catalog violations associated with different users or groups of users. The activity data stored in the data catalog 250 may include data for activities such as, but not limited to, uploading, downloading, moving, copying, deleting, viewing, editing, modifying, renaming, changing permissions, and the like. The activity data may be logged along with the user involved in each activity and timestamps of times at which activities occurred.

The classification engine 260 may be configured to utilize multiple classification algorithms in a layered approach. Such algorithms may include, but are not limited to, exact data matching (EDM), regular expression (RegEx) pattern matching, fine-tuned named entity recognition (NER), and optical character recognition (OCR). In some embodiments, the classification engine 260 utilizes one or more language models (e.g., large language models) in order to support classification.

The orchestration engine 270 is configured to analyze the data in the data catalog 250 with respect to classifications output by the classification engine 260 using a set of orchestration rules in order to identify combinations of data representing violations as part of a data lineage assembly process.

Outputs of the classification engine 260 and the orchestration engine 270 as applied to the data catalog 250 may be utilized to assemble one or more data lineages into a data genealogy, or a collection of data lineages. Each data lineage represents a path of movement of a given portion of data such that the data genealogy may represent movements of various portions of data.

Figure 3:
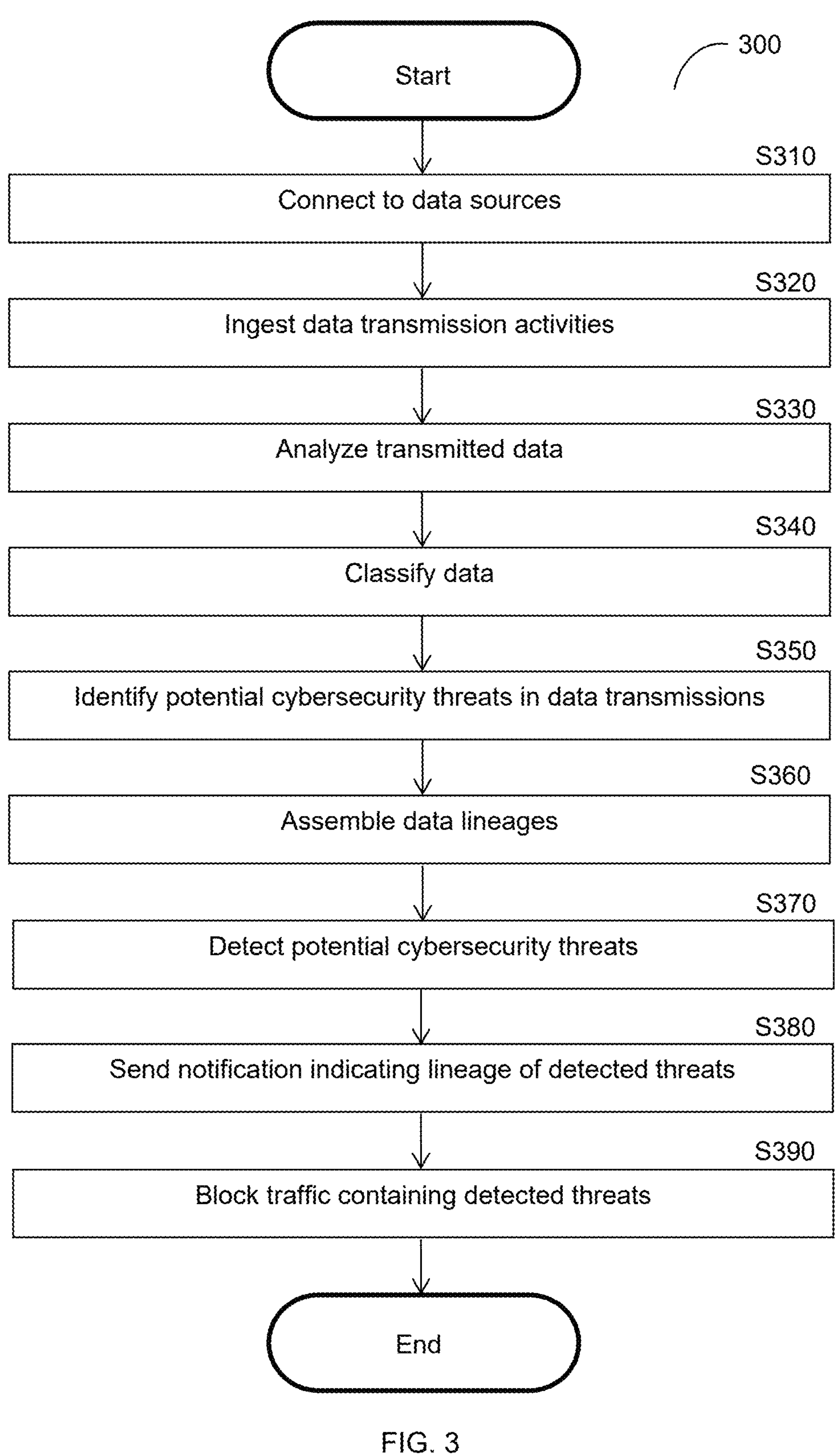
FIG. 3 is a flowchart illustrating a method for protecting data using data lineage according to an embodiment.

FIG. 3 is a flowchart 300 illustrating a method for protecting data using data lineage according to an embodiment. In an embodiment, the method is performed by the data genealogist 130, FIG. 1.

At S310, connections are established with data sources. In an embodiment, the data sources at least include sources of data indicating data transmission activities. That is, in such an embodiment, the data sources include data which indicates times, senders, receivers, types of data, networks used for data transmission, other information related to data transmission, combinations thereof, and the like.

The data sources may be or may include, but are not limited to, software-as-a-service (SaaS) components (e.g., the SaaS components 160, FIG. 1), on-premises components (e.g., the on-premises components 121, FIG. 1), messaging platforms (e.g., email platforms or other messaging platforms realized using messaging servers such as the messaging servers 150, FIG. 1), endpoint components (e.g., the endpoint components 122, FIG. 1), databases in which data from any such data sources is stored, combinations thereof, and the like.

In an embodiment, the connections are established such that movement of data (e.g., movement caused by transmissions of data) can be tracked. That is, the data sources provide data which may be utilized to track other data as it moves within, to, or from one or more computing environments (e.g., the computing environment 120, FIG. 1). For example, data such as, but not limited to, files may be tracked as they move from source to destination.

In some embodiments, the connections are further established such that at least some data transmissions are paused or otherwise temporarily stopped. Such pausing of transmissions may prevent the transmissions from proceeding until the transmission is analyzed for potential cybersecurity threats as discussed below. As a non-limiting example, any data transmissions to external entities (e.g., from an entity within a computing environment to an entity deployed outside of the computing environment) may be halted temporarily until it is confirmed that the data transmission does not represent a cybersecurity threat. To this end, in some embodiments, transmissions from end points within an organization (e.g., one of the endpoint components 122, FIG. 1) may be temporarily halted and then either blocked or allowed to proceed, for example, depending on whether a cybersecurity threat is detected. In some such embodiments, certain data transmissions within the computing environment may be allowed to proceed normally unless and until a cybersecurity threat is detected in such data transmissions, but data transmissions going out of the computing environment or otherwise outside of a predetermined perimeter defined within the computing environment may be paused until threat analysis can be performed.

At S320, data transmission activities are ingested from the data sources. The data transmission activities may be or may include, but are not limited to, uploads (e.g., file uploads to a computing environment), downloads (e.g., file downloads from a computing environment), messages, requests, other transmissions of data, and the like. More specifically, in an embodiment, data being transmitted is ingested from the data sources to facilitate subsequent processing.

At S330, transmitted data represented in the data transmission activities is analyzed. In an embodiment, the analysis includes identifying potential features to be utilized as inputs for classification among the transmitted data. To this end, the analysis may include, but is not limited to, scanning the data, analyzing a structure of the data, analyzing attachments among the transmitted data, analyzing the transmitted data for keywords which may be relevant to classification, combinations thereof, and the like.

At S340, the data is classified. In an embodiment, classifying the data includes applying one or more machine learning models trained to classify data at least with respect to data sensitivity. In a further embodiment, classifying the data includes inputting features identified via the analysis of the transmitted data to the one or more machine learning models such that the machine learning models output classifications for the data. Classifying the data may further include, but is not limited to, applying one or more classification algorithms such as, but not limited to, EDM, RegEx pattern matching, statistical tests, active validation, and the like.

The machine learning models may be trained using a training set including examples of portions of data having different sensitivities. Such a training set may be labeled with labels representing sensitivities of the respective portions of data.

At S350, one or more potential cybersecurity threats are identified. In an embodiment, identifying the potential cybersecurity threats includes running analytics with respect to the transmitted data in order to determine if the data transmission is or includes potentially sensitive data. To this end, in a further embodiment, certain classifications of data may be associated with potentially sensitive data, and data classified into such classifications may be determined as potentially sensitive data such that data containing such potentially sensitive data is determined to represent a cybersecurity threat. As a non-limiting example, data classified as social security numbers (SSNs) may be determined as potentially sensitive data for purposes of detecting a potential cybersecurity threat including a transmission of such potentially sensitive data. In a further embodiment, running the analytics further results in determining a severity of each threat identified among the transmitted data.

In an embodiment, the identifications of cybersecurity threats are triggered based on one or more trigger events defined with respect to data usage or other data-related activities. Such trigger events may be detected based on behavioral analysis, data exfiltration monitoring, sensitive data sharing detection, a combination thereof, and the like.

Behavioral analysis may include, but is not limited to, analyzing normal behavior patterns within an organization in order to identify anomalies or outliers which might represent potential threats.

Data exfiltration monitoring may include, but is not limited to, monitoring data being transferred out of the organization in order to detect, for example, high volumes (e.g., above a threshold amount) of data being transferred out of an organization, which may signal unauthorized data exfiltration.

Sensitive data sharing detection may include identifying certain kinds of activities which are known to be risky such as, but not limited to, sharing certain types of data via unsecured links. The sensitive data sharing detection may be based on the classifications, for example, data which is classified as a certain level of sensitivity (e.g., certain classifications of sensitivity or otherwise sensitivity above a threshold such as a predetermined threshold).

Based on the detected trigger events, potential threats may be identified for subsequent analysis. The potential threats may optionally be prioritized based on the trigger events, for example, by prioritizing certain types of trigger events over others.

At S360, one or more data lineages are assembled. In an embodiment, one or more data lineages are assembled for each potential cybersecurity threat that is identified. That is, in a further embodiment, when a potential cybersecurity threat is identified for a given portion of data (e.g., a given file that was uploaded or downloaded), a data lineage is assembled for that portion of data (e.g., a data lineage for that file).

In an embodiment, assembling a data lineage further includes assembling a data lineage graph. In a further embodiment, assembling the data lineage graph includes extracting the data, transforming the data, and identifying lineage-indicating portions of data. The data lineage may be created based on the identified lineage-indicating portions, and may be created as a graph of connections between entities. An example process for assembling data lineages is described further below with respect to FIG. 4.

At S370, one or more cybersecurity threats are detected based on the assembled data lineages. More specifically, each of the potential cybersecurity threats identified at S350 may be analyzed with respect to a data lineage of the data representing the potential cybersecurity threat in order to determine whether the transmission of that data presents a cybersecurity threat.

In an embodiment, one or more data flows including data involved in each potential cyberthreat are identified. Each data flow may be or may include, but is not limited to, a movement of data from one location (e.g., a location in storage or a logical location such as a particular system or software component) to another location. Moreover, each data flow may be defined with types of locations, for example, types defined with respect to security. As a non-limiting example, a first location corresponding to a Software-as-a-Service (SaaS) application may be known to be a more secure type of location than a second location corresponding to a personal email account such that a data flow involving the movement of potentially sensitive data from the first location to the second location may be detected as a cybersecurity threat.

In some embodiments, detecting the cybersecurity threats based on the assembled data lineages may include applying one or more machine learning models trained to classify combinations of data lineages and data sensitivities into classifications representing whether the combination of data lineage and data sensitivity for a given portion of data represents a cybersecurity threat or not, respectively. Such a machine learning model may be trained using training data including training data lineages and training data sensitivities for historical portions of data, and may optionally be trained using supervised learning with training labels for the portions of data indicating whether transmission of the portion of data with the respective combination of data lineage and data sensitivity represented a cybersecurity threat. Moreover, such a model may be fined tuned by training the model using training data for a given computing environment in order to more accurately tailor the model to normal data lineages for that computing environment, thereby further improving the accuracy of threat detection.

In this regard, it is noted that existing solutions may utilize static rules for detecting cybersecurity threats which are based on, for example, data classification alone or based on predetermined actions that are considered to pose a threat. Other solutions might use classification based on machine learning in order to improve accuracy of determining data sensitivity. However, these processes may still be inaccurate, which in turn may lead to failure to prevent cybersecurity threats. For example, a social security number may appear like a "normal" or otherwise non-sensitive series of numbers, and may therefore be classified as non-sensitive or otherwise conflated with other data including series of numbers.

By analyzing data lineage in addition to classifying the data, accuracy of threat detection may be improved, which in turn may reduce the number of false positives, false negatives, or both. For example, the data classifications used for detecting potential cyber threats in accordance with various disclosed embodiments which utilize data lineages may be set lower in order to capture more potential cybersecurity threats while ultimately narrowing down the potential cybersecurity threats into a set of detected cybersecurity threats using data lineage such that the cybersecurity threats which are ultimately detected more accurately reflect cybersecurity threats. Likewise, behavior which would otherwise be detected as a cybersecurity threat based on high sensitivity of data being transmitted may not be detected as a cybersecurity threat in at least some circumstances using various disclosed embodiments, for example, when the data lineage demonstrates that the transmission is a secure or otherwise permissible transmission despite transmitting sensitive data.

Moreover, the disclosed embodiments may be utilized to more efficiently detect cybersecurity threats than at least some existing solutions which utilize classification without data lineage. That is, because potential cybersecurity threats are initially identified using classification and then analyzed for data lineage in order to improve threat detection, the initial classification may be performed using a less accurate or otherwise less resource-intensive classification process (e.g., a process using a machine learning model trained on a lower amount of training data, which has a lower number of parameters, or otherwise requires less processing power and memory to run) while achieving accuracy which is comparable or better than at least some existing solutions.

At S380, a notification indicating the detected threats may be sent. Such a notification may further include additional details about the threats themselves, about data transmitted as part of the threats, the data lineages for the portions of data for which transmission is a cybersecurity threat, and the like.

At S390, traffic representing the detected threats is blocked in order to mitigate the detected threats. Blocking the traffic may be utilized to halt any subsequent transmissions of the portions of data of the detected threats, to stop transmission of those portions of data outside of a computing environment (e.g., to stop transmission of data via the endpoints 122 to external systems outside of the computing environment 120, FIG. 1), and the like. More specifically, in an embodiment, the traffic may be blocked based on the data flows. For example, traffic flowing between a first location and a second location which was identified as a data flow representing a potential cybersecurity threat may be blocked in order to prevent potentially malicious transfers of data.

Figure 4:
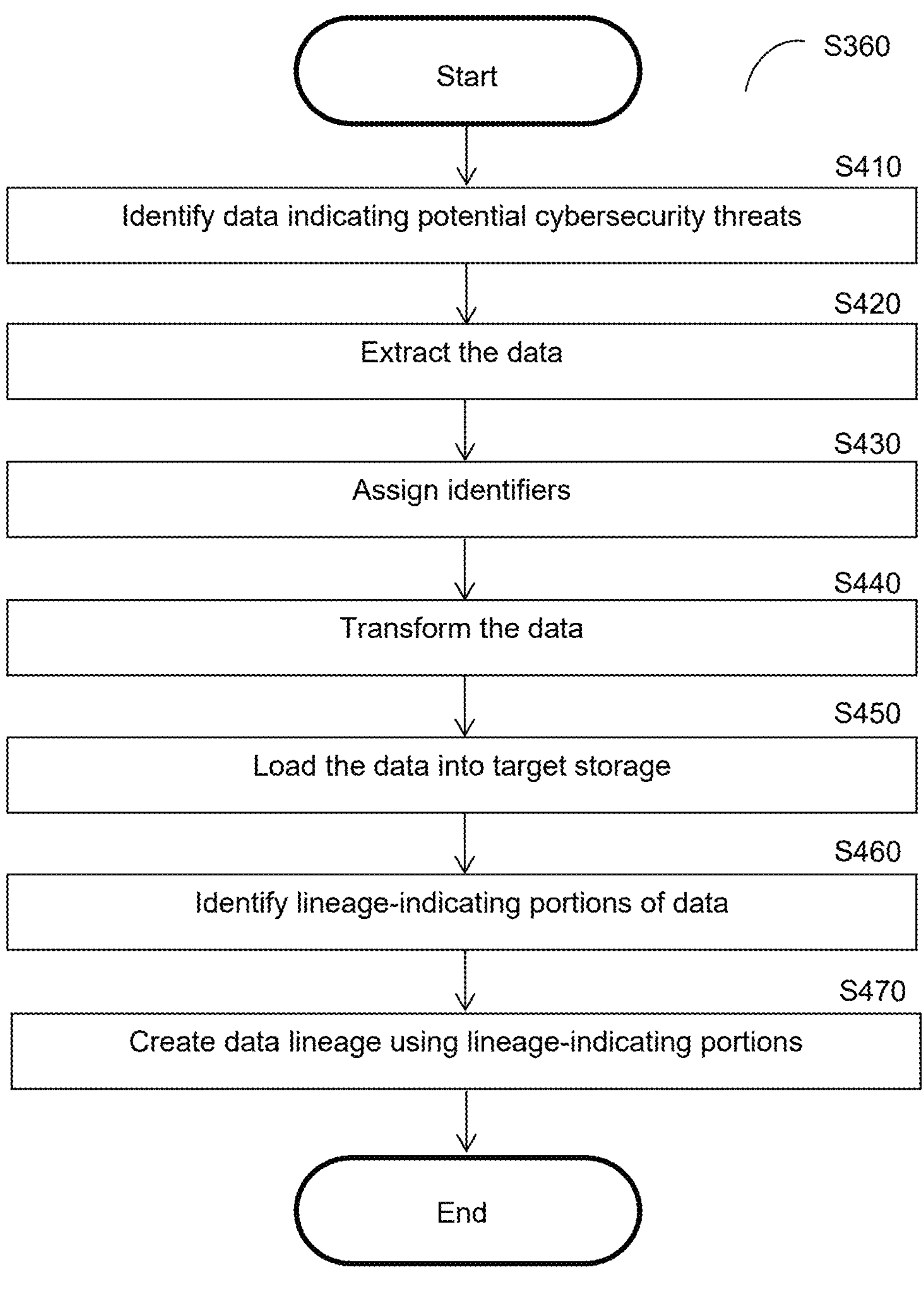
FIG. 4 is a flowchart illustrating a method for assembling a data lineage graph according to an embodiment.

FIG. 4 is a flowchart S360 illustrating a method for assembling a data lineage graph according to an embodiment.

At S410, data indicating potential cybersecurity threats is identified. In an embodiment, the identified potential cybersecurity threats are determined based on classifications of data as discussed above, for example with respect to S350.

In this regard, it is noted that transforming large datasets may take relatively long amounts of time, require large amounts of processing, or both. By identifying potential cybersecurity threats in data and only transforming data related to those potential cybersecurity threats (i.e., data indicating transmissions which represent the cybersecurity threats), subsequent transformation may be performed more efficiently.

At S420, the data indicating potential cybersecurity threats is extracted. In an embodiment, the data is extracted into a data warehouse or data lake. Such a data warehouse or data lake may be utilized as a temporary storage where the extracted data may be transformed and loaded from the temporary storage into a target storage.

At S430, one or more identifiers are assigned to data among the extracted data. In an embodiment, an identifier of a data object is assigned to each instance of data indicating movement of the data object among the extracted data. More specifically, in an embodiment, the identifier assigned to instances of data for a given data object is a unique identifier that is unique to that data object. In other words, such a unique identifier is assigned only to instances of data associated with that data object (e.g., instances of data indicating transmission or other movement of the data object). In this regard, the unique identifier may be utilized to identify a given data object as it moves, which in turn may be utilized to ensure that the data lineage accurately represents the flow of the data object from one location to the next as it moves from a starting location to a destination location.

In a further embodiment, assigning the identifiers further includes identifying different instances of each data object among the extracted data. More specifically, identifying data for instances of data objects included among the extracted data may be compared (i.e., comparing identifying data for one data object instance with identifying data for another data object instance) in order to determine whether data object instances represent the same data object.

In yet a further embodiment, S430 further includes comparing data representing instances of data objects and, in particular, comparing data identifying data objects, in order to identify different data object instance as representing or otherwise being associated with the same underlying data object. To this end, the comparison may include applying one or more data similarity-based comparison algorithms such as, but not limited to, fuzzy hashing (also referred to as similarity hashing). Such similarity hashing may be utilized to detect data which is similar, but not necessarily identical, to other data. Non-limiting examples for similarity-based comparison techniques include context-triggered piecewise hashing (CTPH), SimHash, MinHash, Locality Sensitive Hashing (LSH), combinations thereof, and the like. Such similarity hashes may be performed in order to determine whether the similarity of two portions of object-identifying data is above a threshold (e.g., a predetermined threshold) such that the two portions of data may be determined as representing the same underlying data object despite certain differences.

In this regard, it is noted that data objects such as files may change as they move throughout or between computing environments. For example, a file containing an unsigned document may be sent for signing, and then the file containing the signed document may be further transmitted within a computing environment. The signing therefore alters data of the file such that an exact comparison of the file (e.g., by hashing the file's contents before and after signing, and then comparing the pre-signing and post-signing hashes) may yield a mismatch when in reality the data represents effectively the same file.

Using similarity-based comparisons which do not require an exact match may therefore allow for more accurately tracking movement of data objects within a computing environment for purposes of constructing data lineages, which in turn may improve detection and mitigation of cyber threats based on such data lineages. Moreover, supporting such similarity-based matches with other contextual factors such as time and location (e.g., times and locations of events involving data objects having certain identifiers) allows for further improving accuracy and may avoid false positive matches between instances of data objects.

At S440, the extracted data is transformed. More specifically, the extracted data is transformed in order to facilitate identifying parts of the extracted data which are relevant to data lineage assembly. Transforming the data may include, but is not limited to, applying data mapping, concatenation, both, and the like. In an embodiment, the data is transformed from a first format or structure into a second format or structure, where the second format or structure is that of the target storage to which the transformed data will be loaded.

In an embodiment, the second format or structure has fields corresponding to predetermined parameters known to be indicative of data lineage. Such lineage-indicating parameters may indicate information relevant to data transmission such as, but not limited to, when data was transmitted, where data was transmitted from, where data was transmitted to, and the like. To this end, such parameters may include, but are not limited to, data identifiers (e.g., identifiers indicated in metadata which uniquely represent each portion of data), times at which transmission occurred (e.g., a time of a timestamp of a message used to transmit data), amounts of time for transmission (e.g., an amount of time over which a transmission), sender identifying information (e.g., sender identifier such as name, network address, etc.), recipient identifying information (e.g., recipient identifier such as name, network address, etc.), communication channel, protocol used for communication, data volume (i.e., amount of data being transmitted), number of packets, and the like. Such parameters may be included in messages which, in turn, may be analyzed in order to identify the parameters for use in transformation.

At S450, at least a portion of the transformed data is loaded into a target storage. The target storage may be, but is not limited to, a database (e.g., the database 140, FIG. 1). More specifically, values for the lineage-indicating parameters are loaded into respective fields of the target storage.

In an embodiment, portions of the transformed data which are relevant to assembling data lineages are loaded into the target storage. In a further embodiment, only such portions of data which are relevant to assembling data lineages are loaded into the target storage. This may allow for reducing the amount of data to be loaded into and stored in the target storage to only data needed for assembling data lineages, thereby conserving computing resources. As noted above, the data may be transformed in order to allow for readily identifying portions of the data which are to be loaded into the target storage.

At S460, lineage-indicating portions of data are identified among the transformed data. In an embodiment, the lineage-indicating portions of data are identified with respect to fields in which they are stored, thereby identifying what each value among the lineage-indicating portions represents (e.g., for a value of 80 in a field corresponding to amount of time of a data transmission in microseconds, that value represents that the transmission took 80 microseconds).

At S470, a data lineage is created using the lineage-indicating portions of data. In an embodiment, the data lineage is realized as a graph including a set of nodes and a set of edges, where the nodes represent components that transmit data, store data, receive data, or a combination thereof, for example components within a computing environment (e.g., the on-premises components 121 and the endpoint components 122, FIG. 1), external components that communicate with the components within the computing environment (e.g., the messaging servers 150, the SaaS components 160, or both, FIG. 1), both, and the like.

The edges may represent transmissions of data between those components. As a non-limiting example, an edge between an endpoint node and a messaging server node may represent a transmission of data from an endpoint to a messaging server. In at least some embodiments, a given pair of components may have multiple edges between them, for example when multiple portions of data were transmitted between those components.

In an embodiment, creating the data lineage includes collecting events from among the lineage-indicating portions of data, correlating the events, and constructing a data lineage. More specifically, events are collected from portions of the transformed data originating from various sensors across different environments in order to provide a comprehensive and nuanced representation of the data lineage.

Using the transformed data, the events may be correlated based on shared attributes of entities involved in the events. In an embodiment, the shared attributes used to correlate events include common locations and common unique identifiers of data objects involved in the events such that the correlated events represent events which collectively represent movement of data across locations. In other words, the shared attributes allow for correlating events in order to identify the movement of certain pieces of data (e.g., data objects) as they move throughout or between computing environments. As noted above, by assigning unique identifiers to data objects, the data objects may be uniquely identified for purposes of constructing a data lineage. Moreover, as also noted above, using unique identifiers determined based on similarity (e.g., using similarity hashing) rather than based on exact matching may allow for tracking data objects as data objects are modified during transit.

Other non-limiting examples for such shared attributes include file has, filename, user information, and the like. As a non-limiting example, if a file is created in a first location, then downloaded from the first location to an endpoint acting as a second location, and then uploaded from the second location to a third location, these events (file creation, downloading, and uploading) may be correlated based on shared attributes in the form of common locations involved in the events. The correlations of the events based on these common locations (i.e., the second location for the first and second events, and the third location for the second and third events) therefore allows the correlated events to be used to determine how data moves throughout an environment, how data moves between environments, both, and the like.

The correlated events are assembled in order to construct a data lineage. More specifically, correlated events may be linked within the data lineage and organized (e.g., with respect to times at which the events occurred such that earlier events are represented earlier in the organization). By correlating events based on shared attributes and using the correlated events to construct the data lineage, a clear map of how data moves and transforms across systems may be created.

In some embodiments, the graph of the data lineage may be realized as a weighted graph in which each edge further has one or more associated weights. Such weights may represent, for example but not limited to, information about each data transmission (e.g., an amount of time for the transmission, an amount of data which was transmitted, etc.), information about the data being transmitted (e.g., a respective unique identifier for each portion of data being transmitted such as a unique identifier of a file), both, and the like.

Figure 5:
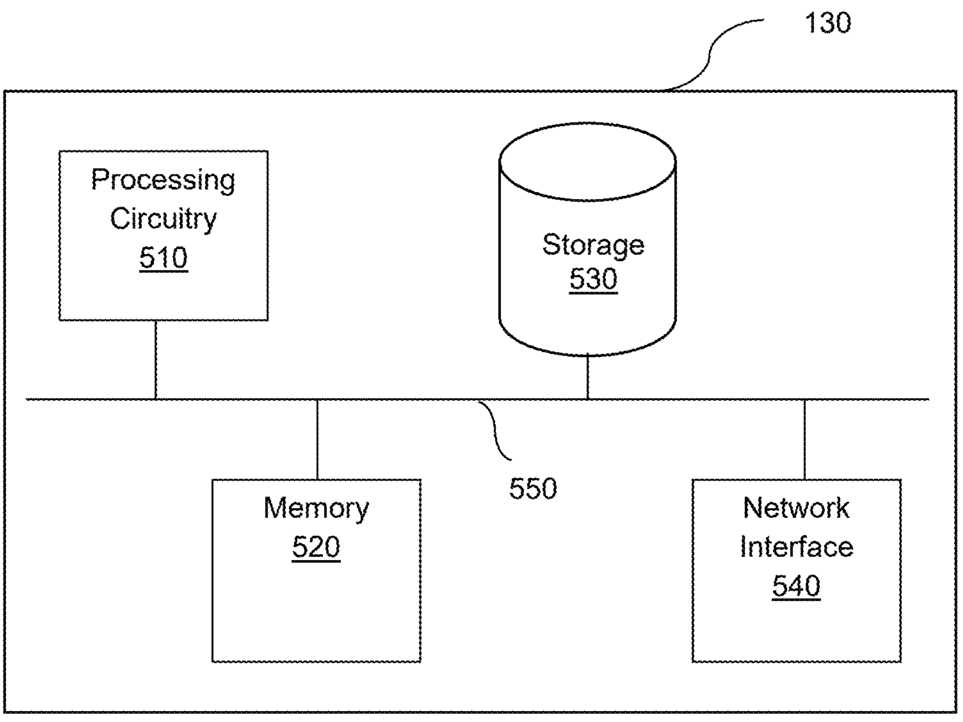
FIG. 5 is a schematic diagram of a data genealogist according to an embodiment.

FIG. 5 is an example schematic diagram of a data genealogist 130 according to an embodiment. The data genealogist 130 includes a processing circuitry 510 coupled to a memory 520, a storage 530, and a network interface 540. In an embodiment, the components of the data genealogist 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the data genealogist 130 to communicate with other systems, devices, components, applications, or other hardware or software components, for example as described herein.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing data, comprising:

assigning a plurality of identifiers to a plurality of instances of a plurality of data objects represented in data indicating movement of the plurality of data objects, wherein each identifier of the plurality of identifiers uniquely corresponds to exactly one data object of the plurality of data objects, wherein assigning the plurality of identifiers to the plurality of instances of the plurality of data objects further comprises performing similarity hashing in order to determine whether instances among the plurality of instances match, wherein the plurality of identifiers is assigned based on the similarity hashing;

transforming the data indicating movement of the data objects from a first format to a second format, wherein the second format is a data structure having a plurality of fields corresponding to a plurality of data lineage parameters, wherein the plurality of data lineage parameters include location, time, and the plurality of identifiers;

correlating a plurality of events represented in the transformed data, wherein the plurality of events is correlated based on shared attributes among events of the plurality of events, wherein the shared attributes at least include common locations and common unique identifiers of the data objects among the plurality of data objects involved in events among the plurality of events;

constructing a data lineage based on the correlated plurality of events, wherein constructing the data lineage includes linking between events among the plurality of events based on the correlation and organizing the linked events with respect to time;

classifying the transformed data into at least one data sensitivity classification;

detecting a cybersecurity threat based on the data lineage and the at least one data sensitivity classification, wherein detecting the cybersecurity threat further includes determining whether the combination of the data lineage and the at least one data sensitivity classification represents a cybersecurity threat, wherein detecting the cybersecurity threat further comprises applying a machine learning model to features of the data lineage and the at least one data sensitivity classification, wherein the machine learning model is trained to classify the combination of the data lineage and the at least one data sensitivity classification into a classification representing whether the combination represents a cybersecurity threat; and mitigating the cybersecurity threat by at least blocking traffic with respect to the cybersecurity threat.

2. The method of claim 1, wherein detecting the cybersecurity threat further comprises:

identifying a plurality of data flows based on the data lineage, wherein each data flow includes a movement of data, wherein the cybersecurity threat is mitigated based on the identified plurality of data flows.

3. The method of claim 2, wherein the cybersecurity threat is detected within at least one data flow of the plurality of data flows, wherein the traffic is blocked for at least a portion of the at least one data flow in which the cybersecurity threat is detected.

4. The method of claim 1, wherein detecting the cybersecurity threat further comprises analyzing the data indicating movement of the data objects with respect to normal behavior patterns.

5. The method of claim 1, wherein detecting the cybersecurity threat further comprises performing data exfiltration monitoring in order to identify an amount of data being transferred outside of a computing environment that is above a threshold.

6. The method of claim 1, wherein the second format is a format of a storage, further comprising:

loading at least a portion of the transformed data into the storage based on data among the transformed data stored in fields of the plurality of fields corresponding to the plurality of data lineage parameters.

7. The method of claim 6, wherein only the data among the transformed data stored in fields of the plurality of fields corresponding to the plurality of data lineage parameters is loaded into the storage.

8. The method of claim 1, wherein the data lineage is a graph including a plurality of nodes and a plurality of edges between nodes among the plurality of nodes, wherein the plurality of nodes represent a plurality of components that interact with data stored in at least one computing environment, wherein the plurality of edges represent movement of data between components among the plurality of components represented by the nodes.

9. A non-transitory computer-readable medium having stored thereon instructions for causing a processing circuitry to execute a process, the process comprising:

assigning a plurality of identifiers to a plurality of instances of a plurality of data objects represented in data indicating movement of the plurality of data objects, wherein each identifier of the plurality of identifiers uniquely corresponds to exactly one data object of the plurality of data objects, wherein assigning the plurality of identifiers to the plurality of instances of the plurality of data objects further comprises performing similarity hashing in order to determine whether instances among the plurality of instances match, wherein the plurality of identifiers is assigned based on the similarity hashing;

transforming the data indicating movement of the data objects from a first format to a second format, wherein the second format is a data structure having a plurality of fields corresponding to a plurality of data lineage parameters, wherein the plurality of data lineage parameters include location, time, and the plurality of identifiers;

correlating a plurality of events represented in the transformed data, wherein the plurality of events is correlated based on shared attributes among events of the plurality of events, wherein the shared attributes at least include common locations and common unique identifiers of the data objects among the plurality of data objects involved in events among the plurality of events;

constructing a data lineage based on the correlated plurality of events, wherein constructing the data lineage includes linking between events among the plurality of events based on the correlation and organizing the linked events with respect to time;

classifying the transformed data into at least one data sensitivity classification;

detecting a cybersecurity threat based on the data lineage and the at least one data sensitivity classification, wherein detecting the cybersecurity threat further includes determining whether the combination of the data lineage and the at least one data sensitivity classification represents a cybersecurity threat, wherein detecting the cybersecurity threat further comprises applying a machine learning model to features of the data lineage and the at least one data sensitivity classification, wherein the machine learning model is trained to classify the combination of the data lineage and the at least one data sensitivity classification into a classification representing whether the combination represents a cybersecurity threat; and mitigating the cybersecurity threat by at least blocking traffic with respect to the cybersecurity threat.

10. A system for securing data, comprising:

a processing circuitry; and a memory, the memory containing instructions that, when executed by the processing circuitry, configure the system to:

assign a plurality of identifiers to a plurality of instances of a plurality of data objects represented in data indicating movement of the plurality of data objects, wherein each identifier of the plurality of identifiers uniquely corresponds to exactly one data object of the plurality of data objects, wherein the system is further configured to perform similarity hashing in order to determine whether instances among the plurality of instances match, wherein the plurality of identifiers is assigned based on the similarity hashing;

transform the data indicating movement of the data objects from a first format to a second format, wherein the second format is a data structure having a plurality of fields corresponding to a plurality of data lineage parameters, wherein the plurality of data lineage parameters include location, time, and the plurality of identifiers;

correlate a plurality of events represented in the transformed data, wherein the plurality of events is correlated based on shared attributes among events of the plurality of events, wherein the shared attributes at least include common locations and common unique identifiers of the data objects among the plurality of data objects involved in events among the plurality of events;

construct a data lineage based on the correlated plurality of events, wherein constructing the data lineage includes linking between events among the plurality of events based on the correlation and organizing the linked events with respect to time;

classify the transformed data into at least one data sensitivity classification;

detect a cybersecurity threat based on the data lineage and the at least one data sensitivity classification, wherein detecting the cybersecurity threat further includes determining whether the combination of the data lineage and the at least one data sensitivity classification represents a cybersecurity threat, wherein the system is further configured to apply a machine learning model to features of the data lineage and the at least one data sensitivity classification, wherein the machine learning model is trained to classify the combination of the data lineage and the at least one data sensitivity classification into a classification representing whether the combination represents a cybersecurity threat; and mitigate the cybersecurity threat by at least blocking traffic with respect to the cybersecurity threat.

11. The system of claim 10, wherein the system is further configured to:

identify a plurality of data flows based on the data lineage, wherein each data flow includes a movement of data, wherein the cybersecurity threat is mitigated based on the identified plurality of data flows.

12. The system of claim 11, wherein the cybersecurity threat is detected within at least one data flow of the plurality of data flows, wherein the traffic is blocked for at least a portion of the at least one data flow in which the cybersecurity threat is detected.

13. The system of claim 10, wherein detecting the cybersecurity threat further comprises analyzing the system is further configured to analyze the data indicating movement of the data objects with respect to normal behavior patterns.

14. The system of claim 10, wherein detecting the cybersecurity threat further comprises analyzing the system is further configured to perform data exfiltration monitoring in order to identify an amount of data being transferred outside of a computing environment that is above a threshold.

15. The system of claim 10, wherein the second format is a format of a storage, wherein the system is further configured to:

load at least a portion of the transformed data into the storage based on data among the transformed data stored in fields of the plurality of fields corresponding to the plurality of data lineage parameters.

16. The system of claim 15, wherein only the data among the transformed data stored in fields of the plurality of fields corresponding to the plurality of data lineage parameters is loaded into the storage.

17. The system of claim 10, wherein the data lineage is a graph including a plurality of nodes and a plurality of edges between nodes among the plurality of nodes, wherein the plurality of nodes represent a plurality of components that interact with data stored in at least one computing environment, wherein the plurality of edges represent movement of data between components among the plurality of components represented by the nodes.

* * * * *